United States Patent
Beit Aharon et al.

(10) Patent No.: US 12,524,240 B2
(45) Date of Patent: Jan. 13, 2026

(54) ADAPTIVE DYNAMIC DISPATCH OF MICRO-OPERATIONS

(71) Applicant: Intel Corporation, Santa Clara, CA (US)

(72) Inventors: Or Beit Aharon, Ramat Yishai (IL); Zeev Sperber, Zichron Yackov (IL); Gavri Berger, Haifa (IL); Amit Gradstein, Binyamina (IL); Nofar Hasson, Kefar Truman (IL)

(73) Assignee: Intel Corporation, Santa Clara, CA (US)

( * ) Notice: Subject to any disclaimer, the term of this patent is extended or adjusted under 35 U.S.C. 154(b) by 871 days.

(21) Appl. No.: 17/561,394

(22) Filed: Dec. 23, 2021

(65) Prior Publication Data

US 2023/0205538 A1 Jun. 29, 2023

(51) Int. Cl.
*G06F 9/38* (2018.01)
*G06F 9/30* (2018.01)

(52) U.S. Cl.
CPC .......... *G06F 9/3836* (2013.01); *G06F 9/3001* (2013.01); *G06F 9/30145* (2013.01)

(58) Field of Classification Search
CPC ... G06F 9/3836; G06F 9/3001; G06F 9/30145
See application file for complete search history.

(56) References Cited

U.S. PATENT DOCUMENTS

| | | | |
|---|---|---|---|
| 6,826,704 B1 | 11/2004 | Pickett | |
| 7,836,284 B2 * | 11/2010 | Dockser | G06F 1/3203 712/43 |
| 8,806,253 B2 * | 8/2014 | Niggemeier | G06F 1/3287 712/214 |
| 2012/0254595 A1 | 10/2012 | Wu et al. | |

(Continued)

FOREIGN PATENT DOCUMENTS

| | | |
|---|---|---|
| EP | 2515200 A1 | 10/2012 |
| EP | 2587366 A1 | 5/2013 |
| WO | 02/73336 A2 | 9/2002 |
| WO | WO-02073336 A2 * | 9/2002 ........... G06F 1/3203 |

* cited by examiner

OTHER PUBLICATIONS

Office Action, EP App. No. 22205056.9, Mar. 20, 2024, 5 pages.
European Search Report and Search Opinion, EP App. No. 22205056.9, Apr. 20, 2023, 7 pages.

*Primary Examiner* — Robert E Fennema
(74) *Attorney, Agent, or Firm* — Nicholson De Vos Webster & Elliott LLP

(57) ABSTRACT

Embodiments systems for adaptive dynamic dispatch of micro-operations are disclosed. An embodiment includes redundant execution units; a dispatcher to dispatch micro-operations to the redundant execution units, the micro-operations having multiple micro-operation types; a first counter to generate a first count of dispatches, during a window, of micro-operations having a first type; a second counter to generate a second count of dispatches, during the window, of micro-operations having any type; control hardware to cause a switch between a first mode and a second mode based in part on the first count and the second count; and a dispatcher to, in the first mode, dispatch micro-operations having the first type to only a subset of the redundant execution units, and, in the second mode, is to dispatch micro-operations having the first type to all of the redundant execution units.

14 Claims, 10 Drawing Sheets

(56) References Cited

U.S. PATENT DOCUMENTS

| | | | | |
|---|---|---|---|---|
| 2012/0258666 A1* | 10/2012 | Kasami | .................. | H04W 4/80 |
| | | | | 455/41.2 |
| 2013/0111191 A1* | 5/2013 | Murray | .................. | G06F 11/30 |
| | | | | 712/214 |
| 2015/0378412 A1* | 12/2015 | Suryanarayanan | ... | G06F 9/3836 |
| | | | | 713/340 |
| 2016/0004665 A1* | 1/2016 | Elmer | .................. | G06F 7/4876 |
| | | | | 708/520 |
| 2021/0224071 A1* | 7/2021 | Batley | .................. | G06F 1/3293 |

FOREIGN PATENT DOCUMENTS

ADAPTIVE DYNAMIC DISPATCH OF MICRO-OPERATIONS

FIELD OF INVENTION

The field of invention relates generally to information processing, and, more specifically, but without limitation, to processor micro-architecture.

BACKGROUND

A processor or execution core in an information processing system may include more than one execution resource that may perform an operation or operations corresponding to an instruction invoked by software. For example, software may invoke, on a core, a fused-multiply-add (FMA) instruction that may be decoded into an FMA micro-operation. The core may include two or more execution units capable of performing the FMA micro-operation.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
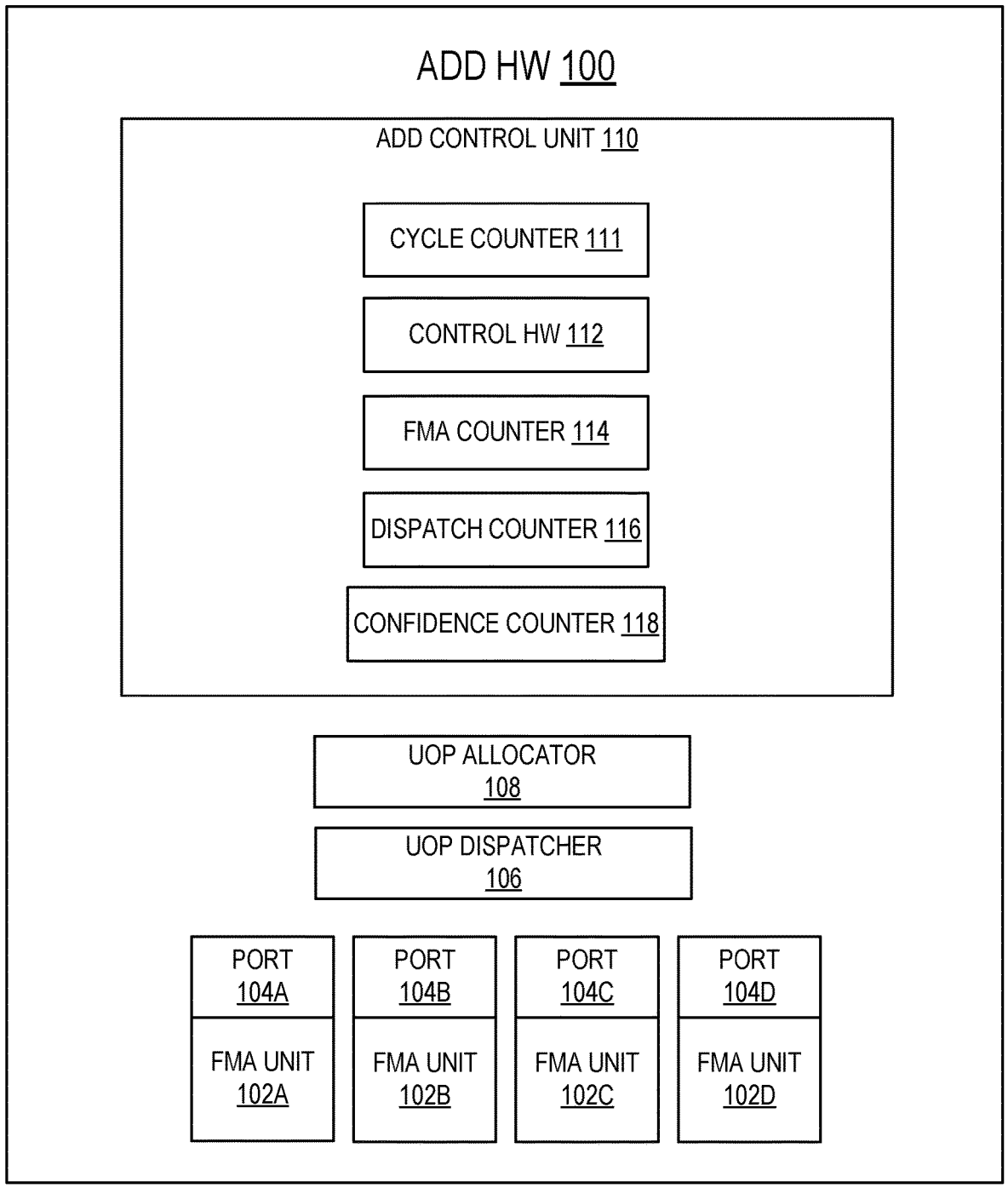
FIG. 1A is a block diagram of adaptive dynamic dispatch hardware according to embodiments.

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner. Also, as used in descriptions of embodiments, a "/" character between terms may mean that an embodiment may include or be implemented using, with, and/or according to the first term and/or the second term (and/or any other additional terms).

Also, the terms "bit," "flag," "field," "entry," "indicator," etc., may be used to describe any type or content of a storage location in a register, table, database, or other data structure, whether implemented in hardware or software, but are not meant to limit embodiments to any particular type of storage location or number of bits or other elements within any particular storage location. For example, the term "bit" may be used to refer to a bit position within a register and/or data stored or to be stored in that bit position. The term "clear" may be used to indicate storing or otherwise causing the logical value of zero to be stored in a storage location, and the term "cleared" may refer to the state after the storing or causing has occurred. The term "set" may be used to indicate storing or otherwise causing the logical value of one, all ones, or some other specified value to be stored in a storage location, and the term "set" may also refer to the state after the storing or causing has occurred. However, these terms are not meant to limit embodiments of the present invention to any particular logical convention, as any logical convention may be used within embodiments of the present invention.

As mentioned in the background section, a processor or execution core in an information processing system may include more than one execution resource that may perform an operation or operations corresponding to an instruction invoked by software. These execution resources may be referred to as redundant. For example, software may invoke, on a core, a fused-multiply-add (FMA) instruction that may be decoded into an FMA micro-operation (uop). The core may include two or more redundant execution units (each, an FMA unit) capable of performing the FMA uop. Therefore, a sequence or thread of instructions that includes multiple FMA instructions may have its corresponding FMA uops dispatched or issued (these two terms may be used interchangeably in this specification) to be executed by any of the redundant FMA units, so two or more of the redundant FMA units may be operating in parallel and/or during execution of the sequence or thread.

Furthermore, the processor or execution core may be subject to or controllable according to a power management technique in which its clock frequency may be changed based on power consumption, power budget, etc.

Therefore, it may be desirable, using embodiments, to adaptively and dynamically control and/or change the number of redundant execution resources to which instructions/uops are dispatched. For example, in a core with four redundant FMA units, the optimal trade-off between power and performance may depend on the number of FMA units being used. In this example, embodiments may provide for adaptively and dynamically switching between a first mode in which all four FMA units are used and a second mode in which only two of the four FMA units are used. Embodiments may include circuitry for determining the number of FMA uops being dispatched relative to other uops, and circuitry for switching between modes based on the determination. In this description, the terms "determining" and "determination" may not require an exact, definitive, or absolute determination (e.g., they may instead correspond to "estimating" and "estimation").

Use of embodiments may be desirable for execution units (e.g., FMA) that may consume more power relative to other execution units (e.g., integer). Use of embodiments may be desirable to increase performance for workloads that use more power-hungry execution resources than other workloads, without decreasing performance for those other workloads.

Differences in power consumption of different units in a core and different types of uops that the core executes implies that in order to achieve an optimal tradeoff between performance and power, the core should work in different frequencies that correspond to the power characteristics of the program being executed. Therefore, using additional hardware might not have the straightforward effect of improving performance, as might be expected. For example, if FMA uops have the highest power cost of all uops, then using additional FMA units might have a negative effect on the overall performance of the core.

More specifically, a problem that arises from moving from two to four FMA units (e.g., supporting four parallel 256-bits FMA uops) is that, if at any given time, the core can execute four 256-bits FMA uops (compared to two 256-bits FMA uops before adding two more), then, in embodiments, the frequency of the core is lowered to support this option. Such embodiments may be based on analysis of the power properties of different uops that may show that using two more FMA units should result in lowering the frequency of the core for any program using a power license that corresponds to 256-bits uops. Such a change in frequency might lead to many programs executing slower, even if only very few or even no FMA uops are required for the execution of these programs.

To mitigate this problem, embodiments use an approach that decides when to use the two additional FMA units. Under typical circumstances a maximum of two FMA units are used (2×FMA mode) so frequency is not hurt. Hardware in embodiments detect cases in which the usage of four FMA units is beneficial even when considering the performance loss due to the lower frequency used when four FMA units are available (4×FMA mode).

In an embodiment (to be introduced here and subsequently detailed and illustrated), in 2×FMA mode, a high level of FMA usage may be detected, indicating that the code can benefit from using two additional FMAs. When this level is detected, the number of overall dispatches per a time period (e.g., 1024 cycle) is saved (this number includes dispatches of uops of all types). This value will later be used as a baseline value to check if the transition to making four FMA units available increased performance.

Then, a transition into 4×FMA mode is performed. In this mode, four 256-bit FMA operations are allowed. To remain in this mode, a confidence counter is used to reflect comparisons of a higher dispatch rate during many time periods against the baseline measured value from the 2×FMA mode. The confidence counter is used to account for periods in which the performance is not significantly higher than the baseline period, despite the overall performance over time remaining higher in 4×FMA mode. If the confidence counter is large enough, then the core remains in 4×FMA mode. Otherwise, a transition into 2×FMA mode is performed.

The preceding discussion and the following description(s) of embodiments, based on FMA instructions, FMA uops, and FMA units, are provided as examples. Embodiments may include execution resources that are not FMA units and/or that are not fully redundant and/or instructions and/or uops other than FMA instructions or uops. Execution units referred to as redundant in described examples may be representative of execution units capable of executing a particular instruction or uop but may differ with regard to executing other instructions or uops. For example, a first execution unit capable of performing an FMA uop but not a floating-point divide (FDIV) uop may be considered redundant, with respect to FMA instructions/uops, to a second execution unit capable of performing both an FMA uop and an FDIV uop.

Also, embodiments may relate to instructions/uops other than FMA; for example, a cryptography instruction such as an encryption instruction in an embodiment with redundant encryption units. Furthermore, embodiments may relate to more than one instruction/uop; for example, with two or more execution units capable of performing both an FMA and a floating-point multiply (FMUL) instruction/uop, FMA and FMUL instructions/uops may be grouped together and treated (e.g.) as may be described for FMA instructions/uops alone.

Also, a described embodiment includes four redundant execution units and a mode in which only two of the four execution units are used; however, embodiments may include any number of redundant execution units and any number of modes in which all or any subset of the redundant execution units are used.

FIG. 1A is a block diagram of adaptive dynamic dispatch hardware (ADD HW) 100 according to embodiments. The apparatus shown in FIG. 1A may be implemented in logic gates and/or any other type of circuitry, all, or parts of which may be integrated into the circuitry of a processing device or any other apparatus in a computer or other information processing system. For example, the apparatus may be implemented in any of core 490 in FIG. 4B, cores 502A to 502N in FIG. 5, processors 610/615 in FIG. 6, processors 770/780 in FIGS. 7 and 8, and cores 902A to 902N in FIG. 9, each as described below.

As shown in the embodiment of FIG. 1A, a core may include four FMA units (102A, 102B, 102C, and 102D), each with a corresponding port (104A, 104B, 104C, and 104D, respectively) to which FMA uops may be allocated by a uop allocator (108) and/or dispatched by a uop dispatcher (106) for execution. In embodiments, each port shown in FIG. 1A may represent one or more ports to provide three 256-bit-wide source data values as inputs to a corresponding FMA unit capable of performing a 256-bit FMA operation (e.g., multiplying two of the inputs and adding the product to the third input). In this specification, dispatch to an execution unit and dispatch to a port of an execution unit may be consider synonymous.

The core also includes adaptive dynamic dispatch (ADD) control unit 110 to control allocation, port-binding, and/or dispatching of uops such that in a first mode (4×FMA mode), all four FMA units are used, and in a second mode (2×FMA mode), only two of the four FMA units are used. Embodiments may provide for determining whether performance is improved by using all four FMA units despite a drop in frequency (e.g., due to a power management technique), selecting a mode based on the determination, and switching between modes.

Various approaches to use of only two FMA units are possible. For example, according to one approach, when in 2×FMA mode, uop allocator 108 and/or uop dispatcher 106 always allocates/port-binds/dispatches FMA uops to only a specific two FMA ports/units (e.g., 104A/102A and 104B/102B). According to another approach, the two FMA ports/unit to which uop allocator 108 and/or uop dispatcher 106 allocates/port-binds/dispatches FMA uops may be different for different periods (e.g., where a period may be defined as the time between entry into 2×FMA mode and exit from 2×FMA mode) and may be based on various approach(es) and/or factor(s) (e.g., alternating between the FMA units, other capabilities of the FMA units, characteristics of the instruction sequence or workload).

Figure 2:
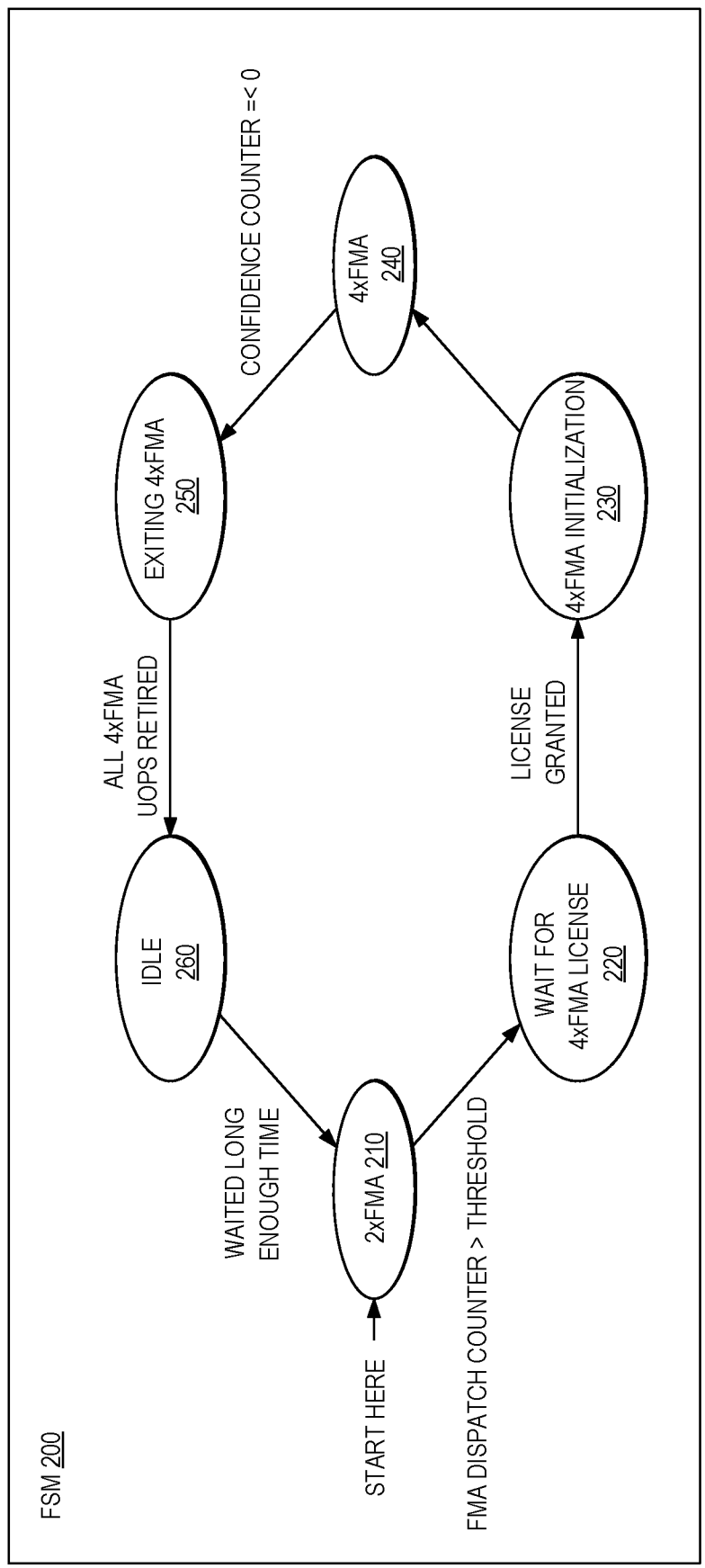
FIG. 2 is a diagram of a state machine for adaptive dynamic dispatch according to embodiments.

ADD control unit 110 includes cycle counter 111, control hardware 112, FMA counter 114, dispatch counter 116, and confidence counter 118. In embodiments, control hardware 112 includes a state machine (e.g., as illustrated in FIG. 2) and/or other circuitry/logic that is to decide whether to be in 4×FMA mode or 2×FMA mode such that all four FMA units are used only if the performance (e.g., as measured by instructions per clock/cycle (IPC)) is enough to compensate for a frequency drop resulting from using all four FMA units. In embodiments, the decision may be based, as described below, on counts and calculations using counts from cycle counter 111, FMA counter 114, dispatch counter 116, and confidence counter 118.

In an embodiment to be further described below and illustrated in FIGS. 1B, 2, and 3, ADD control unit 110 may start in 2×FMA mode and move to 4×FMA mode when many (e.g., more than a threshold number, to be referred to as the FMA threshold) dispatches of FMA uops are observed. In 4×FMA mode, a calculation based on IPC gain is used to decide whether to stay in 4×FMA mode or move back to 2×FMA mode.

Figure 1B:
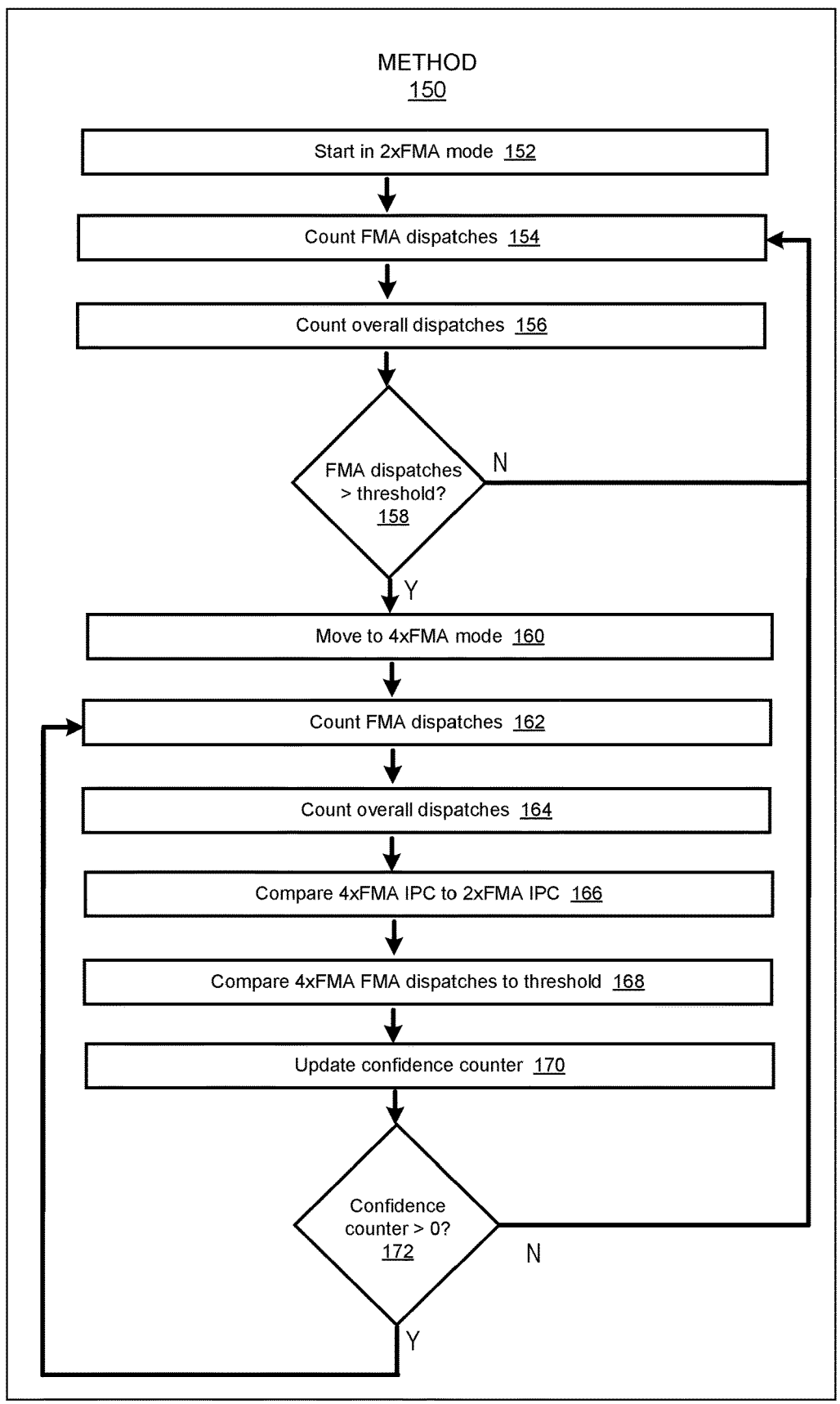
FIG. 1B is a block diagram of a method for adaptive dynamic dispatch according to embodiments.

FIG. 1B is a block diagram of a method 150 for adaptive dynamic dispatch according to embodiments. In various embodiments, values referred to in the description of FIG. 1B and elsewhere in this specification, such as the threshold number of FMA dispatches and/or the window size (e.g., in cycles) may be configurable (e.g., programmable by software or firmware writing to control, configuration, machine-specific, or model-specific registers) and/or different from those described/illustrated.

The term "window" in method 150 may refer to a period measured in clock cycles (e.g., 1024 cycles). Determinations and decisions may be made based on single windows or on averages from multiple windows. Cycle counter 111 may represent any number of counters and/or other circuitry to count cycles, count windows, determine the window size, indicate the end of a window, etc., and may be programmable/configurable (e.g., window size, number of windows, etc.).

Method 150 starts, as shown in block 152, with a core (e.g., a core including adaptive dynamic dispatch hardware 100) in 2×FMA mode. Blocks shown in method 150 (e.g., actions represented by blocks) may be caused and/or performed by hardware/firmware in the core (e.g., ADD control unit 110 of FIG. 1, state machine 200 of FIG. 2). Some of these blocks/actions may be performed in parallel (e.g., the same window(s) may be used for counting FMA uop dispatches (e.g., see block 154) and overall uop dispatches (e.g., see block 156).

In block 154, dispatches of FMA uops (FMA dispatches) in one or more windows are monitored and counted (e.g., by FMA counter 114). In block 156, dispatches of all uops (overall dispatches) in one or more windows are monitored and counted (e.g., by dispatch counter 116). This overall dispatch count is used and/or stored for use as an indication of IPC in the 2×FMA mode, to be used later as a baseline in a comparison to the IPC in 4×FMA mode).

In block 158, the number (or rate calculated from the count) of FMA dispatches is compared to the FMA threshold. If the number is higher than the FMA threshold, method 150 continues in block 160. If not, the core stays in 2×FMA mode (e.g., method 150 returns to block 154).

In block 160, the core moves into 4×FMA mode.

In block 162, dispatches of FMA uops (FMA dispatches) in one or more windows are monitored and counted (e.g., by FMA counter 114). In block 164, dispatches of all uops (overall dispatches) in one or more windows are monitored and counted (e.g., by dispatch counter 116) as an indication of IPC in 4×FMA mode.

This overall dispatch count (or IPC) in 4×FMA mode is compared, in block 166, to the overall dispatch count (or IPC) in 2×FMA mode from block 156. The margin by which the 4×FMA IPC is greater than the 2×FMA serves an indication of IPC gain, In block 168, the number of FMA dispatches in 4×FMA mode from block 162 is compared to a threshold (e.g., a predetermined/configurable value, which may or may not be the same as the FMA threshold used in block 158) to confirm that the IPC gain is due to FMA unit usage.

In block 170, a confidence counter (e.g., confidence counter 118), as described below, is updated based on blocks 166 and 168. For example, if any IPC gain is not significant (e.g., does not adequately compensate for a frequency drop resulting from using all four FMA units) or is not attributable to FMA unit usage, then the confidence counter is decremented; otherwise, the confidence counter is incremented (up to a maximum value).

In block 172, if the confidence counter is greater than zero, the core stays in 4×FMA mode (e.g., method 150 returns to block 162); otherwise, the core moves back to 2×FMA mode (e.g., method 150 returns to block 154, possibly after a delay to prevent excessive switching). In embodiments, the use of a confidence counter is optional and the implementation may vary (e.g., thresholds and/or other values may be different and/or programmable/configurable).

FIG. 2 is a diagram of a finite state machine (FSM) 200 (corresponding to all or part of ADD control hardware 112 in FIG. 1) for adaptive dynamic dispatch according to embodiments. FSM 200 includes six states, shown as "2×FMA" state 210, "wait for 4×FMA license" state 220, "4×FMA initialization" state 230, "4×FMA" state 240, "exiting 4×FMA" state 250, and "idle" state 260. The example may be implemented with a window size of 1024 cycles, and counts related to "FMA uops" may refer more specifically to 256-bit FMA/FMUL uops, but other implementations are possible.

Operation of FSM 200 starts in "2×FMA" state 210, during which the following values are counted:

Number of dispatches of FMA uops in each window.

Number of dispatches of all uops (including integer and floating-point/vector) in each window.

If the number of FMA dispatches (or a first indicator based on the number of FMA dispatches) is greater than a first threshold (e.g., a predefined/configurable threshold), then two actions are triggered:

A request is sent for a power license that corresponds to four FMA units, and the FSM moves to "wait for 4×FMA license" state 220.

The number of overall dispatches (or a second indicator based on the number of overall dispatches) in the window where the threshold was exceeded is saved. This value will later be used to check the performance increase with all four FMAs enabled.

After the power license is granted, four FMA uops can be dispatched per cycle. The port binding will port-bind FMA uops into four ports.

At the end of the first window after the 4×FMA license is granted, FSM 200 moves to "4×FMA initialization" state 230, in which FMA operations are port-binded into four ports and the performance using four FMA ports is allowed to stabilize.

After two windows in "4×FMA initialization" state 230, it may be assumed that the performance in 4×FMA mode is stabilized and can be monitored to see if the performance is increased. To do that, FSM 200 moves to "4×FMA" state 240, in which the following are counted:

Number of dispatches of FMA uops in each window.

Number of dispatches of all uops (including integer and floating-point/vector) in each window.

The overall dispatches counted (or a third indicator based on the overall dispatched counted) in windows in 4×FMA state is compared (a first comparison) to the saved value of overall dispatches in 2×FMA state. Also, the number of FMA dispatches (or a fourth indicator based on the number of FMA dispatches) is compared (a second comparison) to a second threshold (e.g., a predefined, configurable threshold, which may be the same as the first threshold).

A confidence counter is used to check (e.g., using its count as a fifth indicator, as shown in the pseudocode below) that the performance increase is stable and is correlated to FMA usage. This approach filters out atypical windows in which the performance is temporarily reduced. Example pseudocode for this approach is shown below:

```
if (overall dispatches > (1+r)*(saved value)) &&
(FMA dispatches > threshold)
[    if (confidence_counter < max_value) // block incrementing
above max
        then ++confidence_counter
            // increment because 4xFMA is improving performance
]
else --confidence_counter
    // decrement because 4xFMA is not improving performance
if (confidence_counter <= 0)
    then . . . //initiate return to 2xFMA mode
    else . . . //continue in 4xFMA mode
```

In this approach, "r" may be a predefined configurable value. For example, choosing "r" to be ⅛ (12.5%) means that a performance gain of at least 12.5% (1.125 times the saved value) is considered significant. The value of "r" may be based on considerations such as the frequency drop resulting from using all four FMA units.

The confidence counter may be initialized (e.g., in "4×FMA initialization" state 230) to a positive value (e.g., predetermined/configurable) to provide for enough time to pass before it can reach zero. Also, a maximum value (e.g., predetermined/configurable) to which the confidence count may be incremented may be provided.

If/when the confidence counter reaches zero, then a transfer back into 2×FMA state 210 will be made (through "exiting 4×FMA" state 250 and "idle" state 260) by reducing the port-binding of FMA uops to two ports only.

After the last uop that was port-bound in "4×FMA state" 240 retires, a request for a 2×FMA power license is issued. At the end of the first window after the license is received, FSM 200 moves to "idle" state 260, in which only two units are used.

After waiting in "idle" state 260 for enough time (e.g., a predetermined/configurable number of cycles) to allow for stabilization and/or prevent excessive switching, FSM 200 moves back to "2×FMA" state 210.

Figure 3:
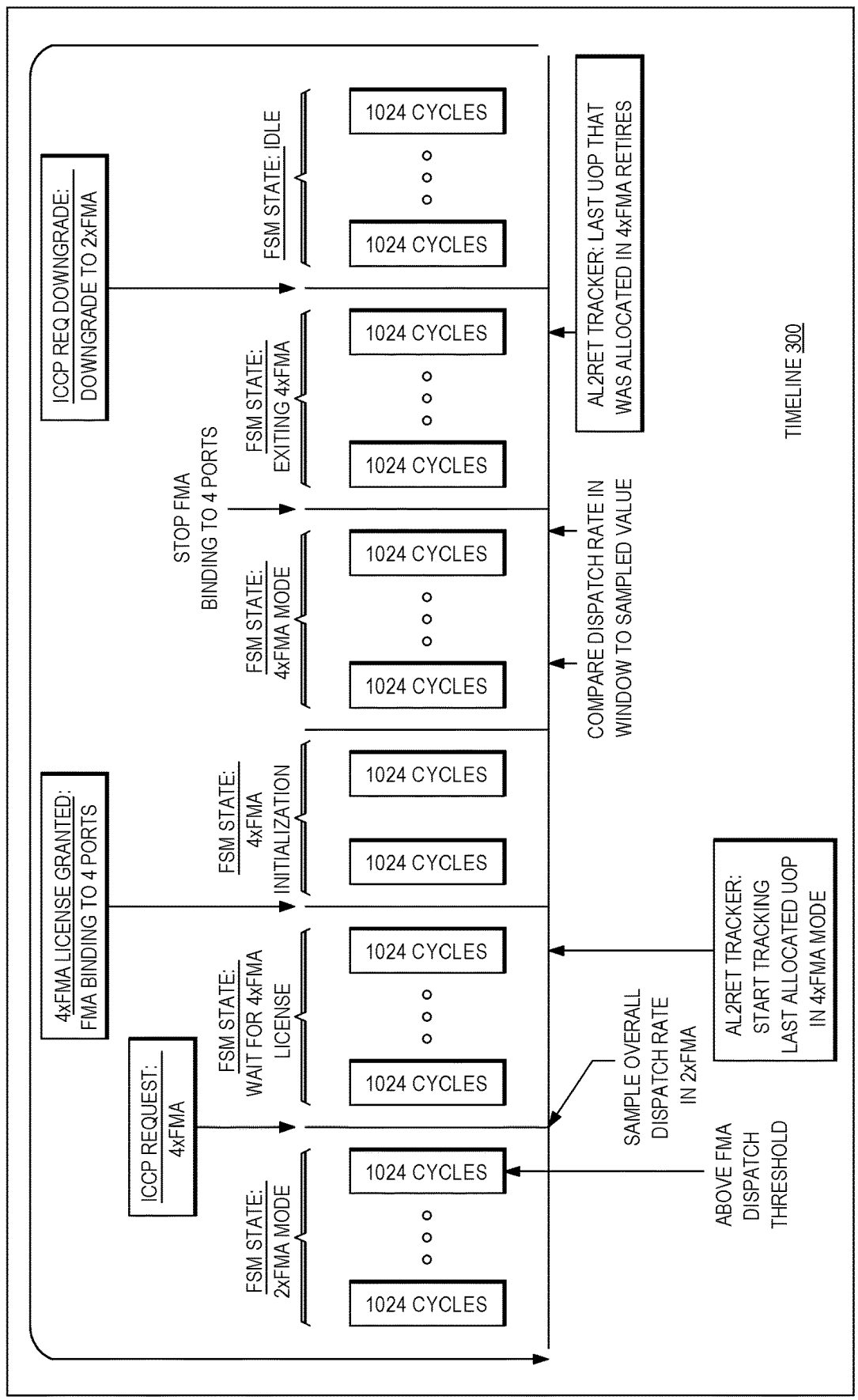
FIG. 3 is a diagram of a timeline of operation of adaptive dynamic dispatch according to embodiments.

FIG. 3 is a diagram of a timeline 300 of operation of adaptive dynamic dispatch according to embodiments. In FIG. 3, reference to an FSM and FSM states may correspond to the FSM and FSM states illustrated in FIG. 2. In FIG. 3, "ICCP request" may refer to a request for a power (e.g., a current protection (ICCP) controller) license to operate in a particular mode, as described above. In FIG. 3, "AL2RET tracker" may refer to hardware to track allocation of FMA uops to provide information to enable returning to 2×FMA mode, as described above.

Example Embodiments

In an embodiment, an apparatus includes a plurality of redundant execution units, a dispatcher, control hardware, a first counter, and a second counter. The dispatcher is to dispatch micro-operations to one or more of the plurality of redundant execution units, the micro-operations having a plurality of micro-operation types. The first counter to generate a first count of dispatches, during a window, of micro-operations having a first type of the plurality of micro-operation types. The second counter to generate a second count of dispatches, during the window, of micro-operations having any type of the plurality of micro-operation types. The control hardware is to cause a switch between a first mode and a second mode based in part on the first count and the second count. In the first mode, the dispatcher is to dispatch micro-operations having the first type to only a subset of the plurality of redundant execution units. In the second mode, the dispatcher is to dispatch micro-operations having the first type to all of the plurality of redundant execution units.

Any such embodiments may include any or any combination of the following aspects. The plurality of redundant execution units may operate at a first clock frequency in the first mode and a second clock frequency in the second mode, wherein the second clock frequency is less than the first clock frequency. The control hardware may also determine, in response to a first indicator reaching a first threshold, to cause a switch from the first mode to the second mode, wherein the indicator is based on the first count to indicate a dispatch rate of micro-operations having the first type in the first mode. The control hardware may also store a second indicator in response to determining to cause the switch from the first mode to the second mode, wherein the second indicator is based on the second count to indicate an overall dispatch rate in the first mode. The control hardware may also determine, based in part on a first comparison of a third indicator to the second indicator, to cause a switch from the second mode to the first mode, wherein the third indicator is based on the second count to indicate an overall dispatch rate in the second mode. The control hardware determining to cause the switch from the second mode to the first mode may also be based on a second comparison of a fourth indicator to a second threshold, wherein the fourth indicator is based on the first count to indicate a dispatch rate of micro-operations having the first type in the second mode. The control hardware determining to cause the switch from the second mode to the first mode may also be based on a consideration of a difference in the first clock frequency and the second clock frequency. The first comparison may be based in part on the consideration of the difference in the first clock frequency and the second clock frequency. The first comparison may be based in part on the consideration of the difference in the first clock frequency and the second clock frequency by multiplying the second count by a configurable value. The apparatus may also include a confidence counter to generate a fifth indicator, wherein the fifth indicator is based on the first comparison and the second comparison to check for stability of a performance increase. Execution of a micro-operation having the first type may consume more power than an average power based on all the plurality micro-operation types. The first type may be a fused multiply-add.

In embodiments, a method includes dispatching, in a first mode, micro-operations having a first type of a plurality of micro-operation types, wherein in the first mode, micro-operations having the first type are dispatched to only a subset of a plurality of redundant execution units; generating a first count of dispatches, during a window, of micro-operations having the first type; generating a second count of dispatches, during the window, of micro-operations having any type of the plurality of micro-operation types; determining, by control hardware to cause a switch from the first mode to a second mode based in part on the first count and the second count, wherein in the second mode, micro-operations having the first type are dispatched to all of the plurality of redundant execution units; switching from the first mode to the second mode; and dispatching, in the first mode, micro-operations having the first type to all of the plurality of redundant execution units.

Any such embodiments may include any or any combination of the following aspects. The plurality of redundant execution units may operate at a first clock frequency in the first mode and a second clock frequency in the second mode, wherein the second clock frequency is less than the first clock frequency. Determining to cause a switch from the first mode to the second mode may be in response to a first indicator reaching a first threshold, wherein the indicator is based on the first count to indicate a dispatch rate of micro-operations having the first type in the first mode. The method may also include storing second indicator in response to determining to cause the switch from the first mode to the second mode, wherein the second indicator is based on the second count to indicate an overall dispatch rate in the first mode. The method may also include determining, based in part on a first comparison of a third indicator to the second indicator, to cause a switch from the second mode to the first mode, wherein the third indicator is based on the second count to indicate an overall dispatch rate in the second mode. Determining to cause the switch from the second mode to the first mode may also be based on a second comparison of a fourth indicator to a second threshold, wherein the fourth indicator is based on the first count to indicate a dispatch rate of micro-operations having the first type in the second mode In embodiments, a system includes a memory and a processor core. The memory is to store a first sequence of instructions and a second sequence of instructions. The processor core has a decoder to decode instructions into micro-operations having a plurality of micro-operation types; a plurality of redundant execution units; a dispatcher to dispatch micro-operations to one or more of the plurality of redundant execution units; a first counter to generate a first count of dispatches, during a window, of micro-operations having a first type of the plurality of micro-operation types; a second counter to generate a second count of dispatches, during the window, of micro-operations having any type of the plurality of micro-operation types; and control hardware to cause a switch between a first mode and a second mode based in part on the first count and the second count; wherein in the first mode, the dispatcher is to dispatch micro-operations having the first type to only a subset of the plurality of redundant execution units; and in the second mode, the dispatcher is to dispatch micro-operations having the first type to all of the plurality of redundant execution units.

Any such embodiments may include any or any combination of the following aspects. The switch between the first mode and the second mode may be caused by a difference in a proportion of instructions to be decoded into micro-operations having the first type in the first sequence of instructions and a proportion of instructions to be decoded into micro-operations having the first type in the second sequence of instructions. The plurality of redundant execution units may operate at a first clock frequency in the first mode and a second clock frequency in the second mode, wherein the second clock frequency is less than the first clock frequency. The control hardware may also determine, in response to a first indicator reaching a first threshold, to cause a switch from the first mode to the second mode, wherein the indicator is based on the first count to indicate a dispatch rate of micro-operations having the first type in the first mode. The control hardware may also store a second indicator in response to determining to cause the switch from the first mode to the second mode, wherein the second indicator is based on the second count to indicate an overall dispatch rate in the first mode. The control hardware may also determine, based in part on a first comparison of a third indicator to the second indicator, to cause a switch from the second mode to the first mode, wherein the third indicator is based on the second count to indicate an overall dispatch rate in the second mode. The control hardware determining to cause the switch from the second mode to the first mode may also be based on a second comparison of a fourth indicator to a second threshold, wherein the fourth indicator is based on the first count to indicate a dispatch rate of micro-operations having the first type in the second mode. The control hardware determining to cause the switch from the second mode to the first mode may also be based on a consideration of a difference in the first clock frequency and the second clock frequency. The first comparison may be based in part on the consideration of the difference in the first clock frequency and the second clock frequency. The first comparison may be based in part on the consideration of the difference in the first clock frequency and the second clock frequency by multiplying the second count by a configurable value. The apparatus may also include a confidence counter to generate a fifth indicator, wherein the fifth indicator is based on the first comparison and the second comparison to check for stability of a performance increase. Execution of a micro-operation having the first type may consume more power than an average power based on all the plurality micro-operation types. The first type may be a fused multiply-add.

In embodiments, an apparatus may include means for performing any function disclosed herein. In embodiments, an apparatus may include a data storage device that stores code that when executed by a hardware processor causes the hardware processor to perform any method disclosed herein. In embodiments, an apparatus may be as described in the detailed description. In embodiments, a method may be as described in the detailed description. In embodiments, a non-transitory machine-readable medium may store instructions that when executed by a machine causes the machine to perform a method including any method disclosed herein. Embodiments may include any details, features, etc. or combinations of details, features, etc. described in this specification.

Example Core Architectures, Processors, and Computer Architectures

The figures below detail example architectures and systems to implement embodiments of the above.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures

In-Order and Out-of-Order Core Block Diagram

Figure 4:
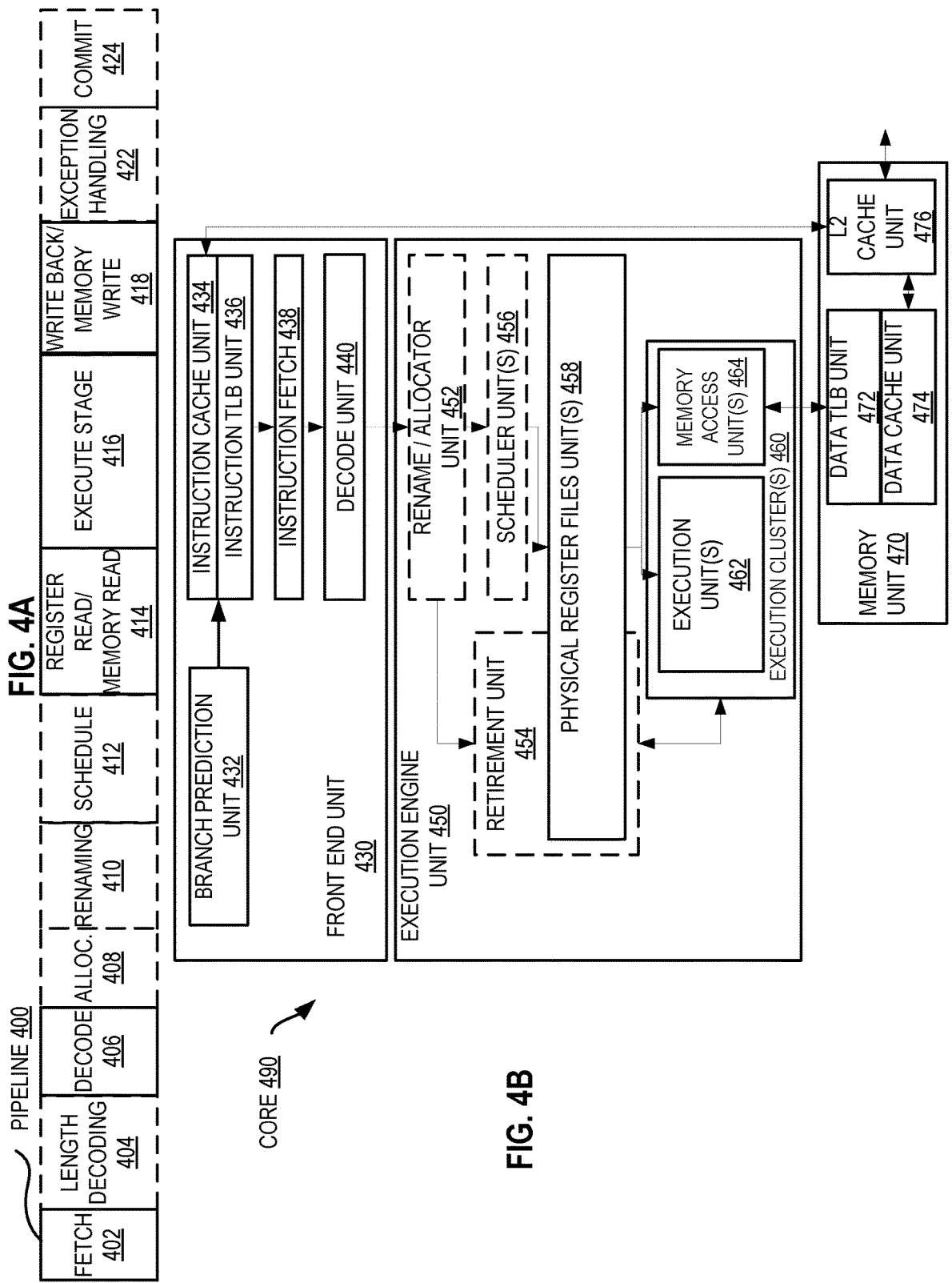
FIG. 4A is a block diagram illustrating both an in-order pipeline and a register renaming, out-of-order issue/execution pipeline according to embodiments.
FIG. 4B is a block diagram illustrating both an in-order architecture core and a register renaming, out-of-order issue/execution architecture core to be included in a processor according to embodiments.

FIG. 4A is a block diagram illustrating both an example in-order pipeline and an example register renaming, out-of-order issue/execution pipeline according to embodiments of the invention. FIG. 4B is a block diagram illustrating both an example embodiment of an in-order architecture core and an example register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front-end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front-end unit 430 includes a branch prediction unit 432, which is coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front-end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general-purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one example embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the example register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
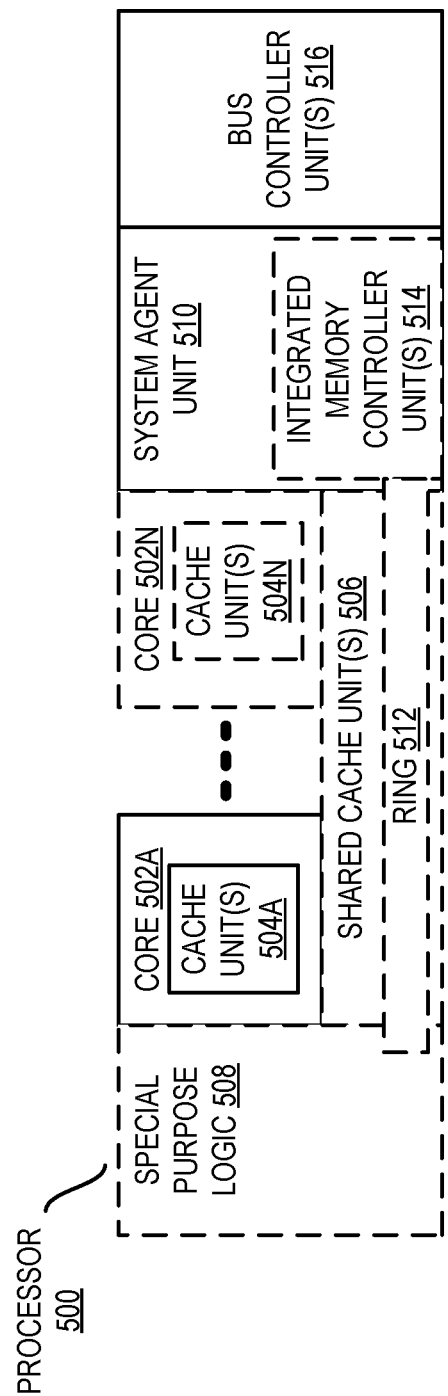
FIG. 5 is a block diagram of a processor that may have more than one core, may have an integrated memory controller, and may have integrated graphics according to embodiments of the invention.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring-based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502A-N.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Example Computer Architectures

FIGS. 6-9 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 6:
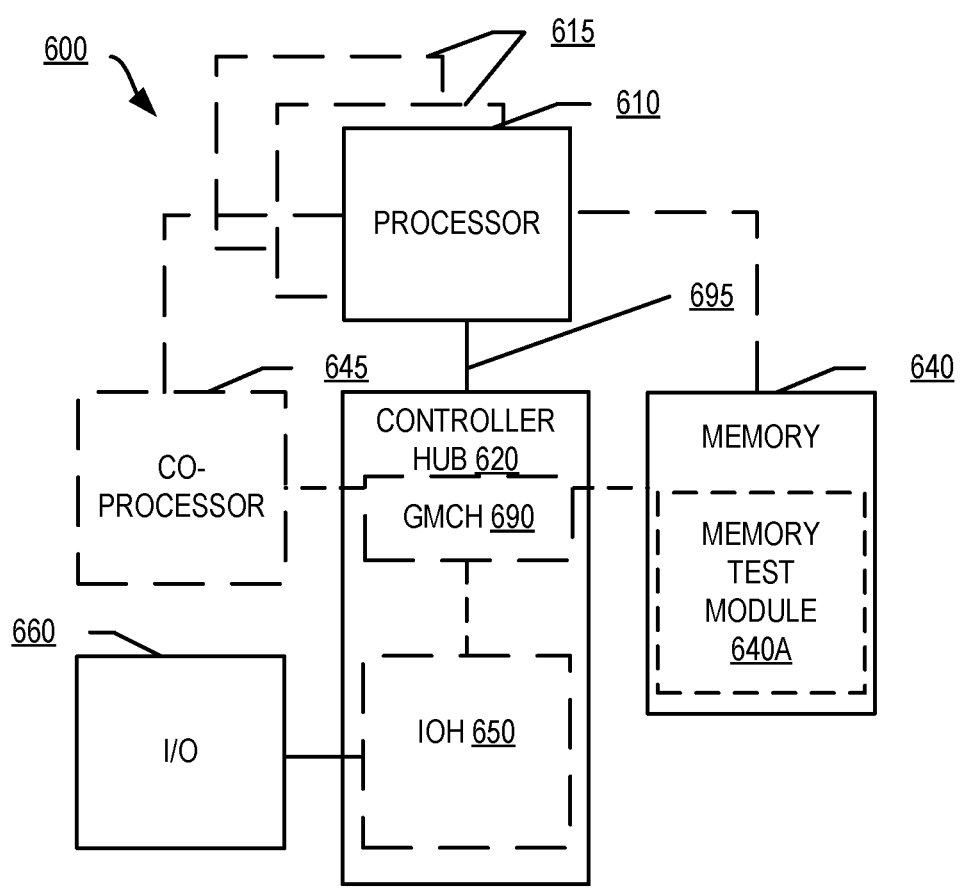
FIG. 6 is a block diagram of a system according to embodiments.

Referring now to FIG. 6, shown is a block diagram of a system 600 in accordance with one embodiment of the present invention. The system 600 may include one or more processors 610, 615, which are coupled to a controller hub 620. In one embodiment, the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random-access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
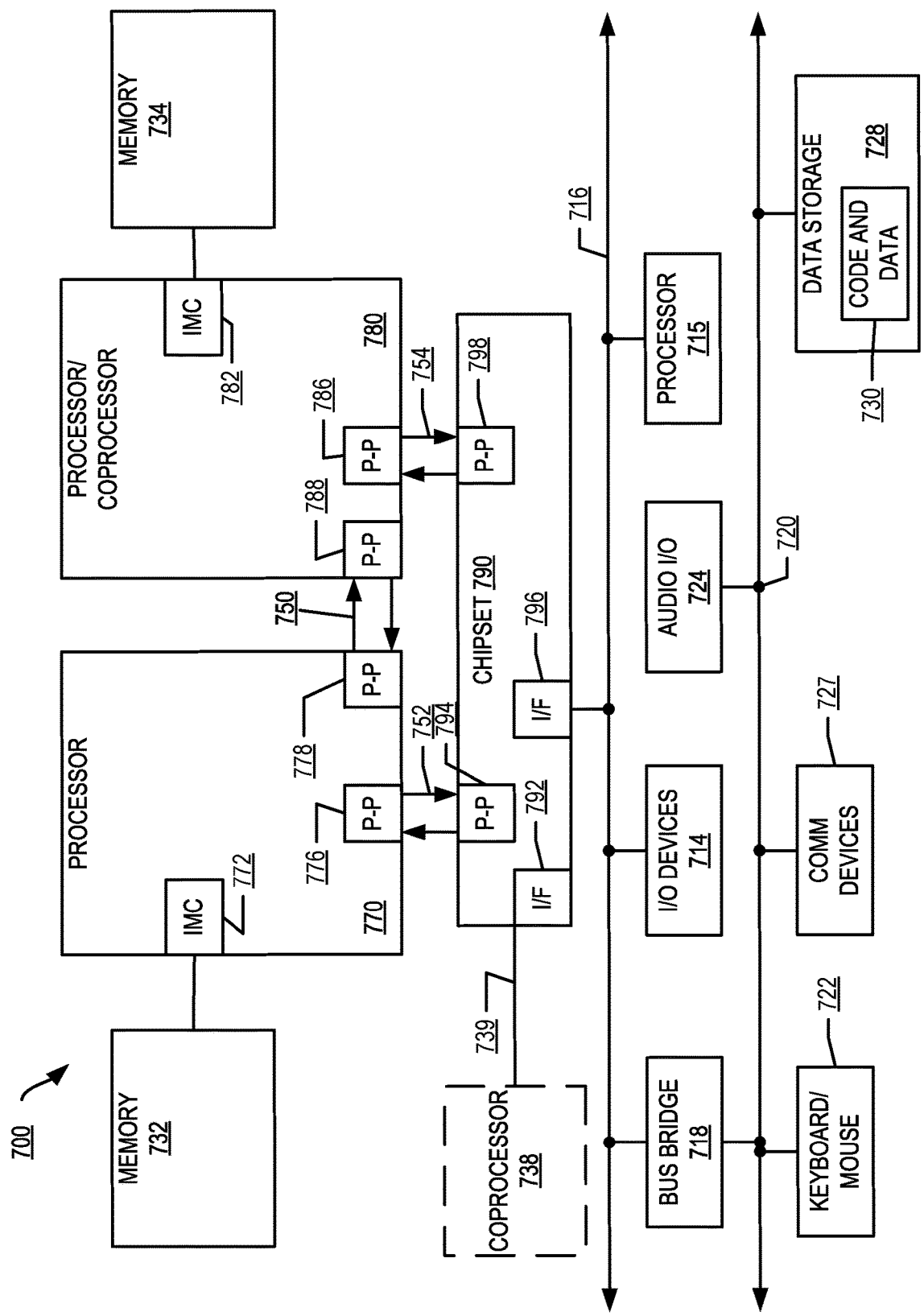
FIG. 7 is a block diagram of a first more specific system according to embodiments.

Referring now to FIG. 7, shown is a block diagram of a first more specific example system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 and coprocessor 645.

Processors 770 and 780 are shown including integrated memory controller (IMC) units 772 and 782, respectively. Processor 770 also includes as part of its bus controller unit's point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
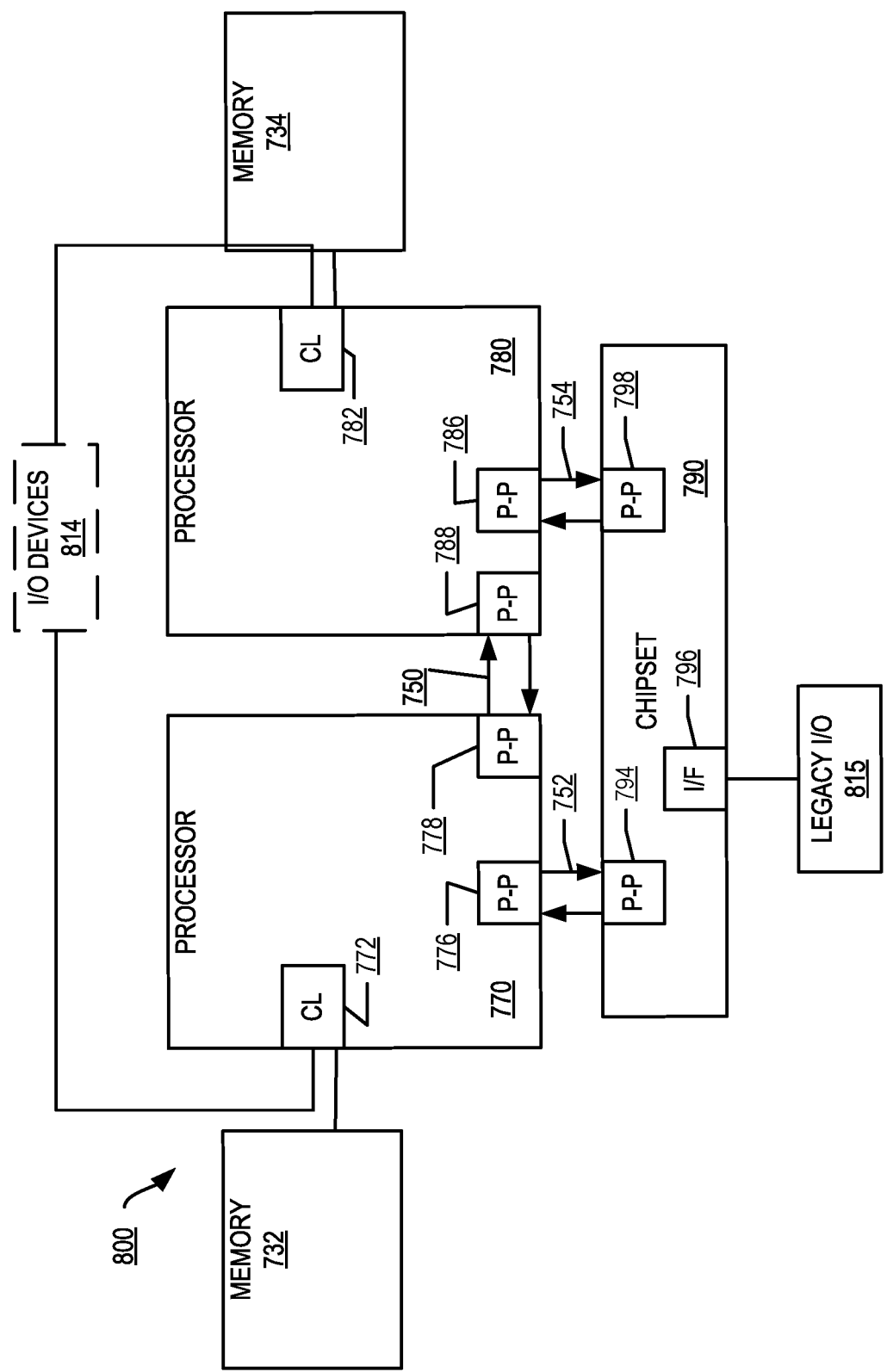
FIG. 8 is a block diagram of a second more specific system according to embodiments.

Referring now to FIG. 8, shown is a block diagram of a second more specific example system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
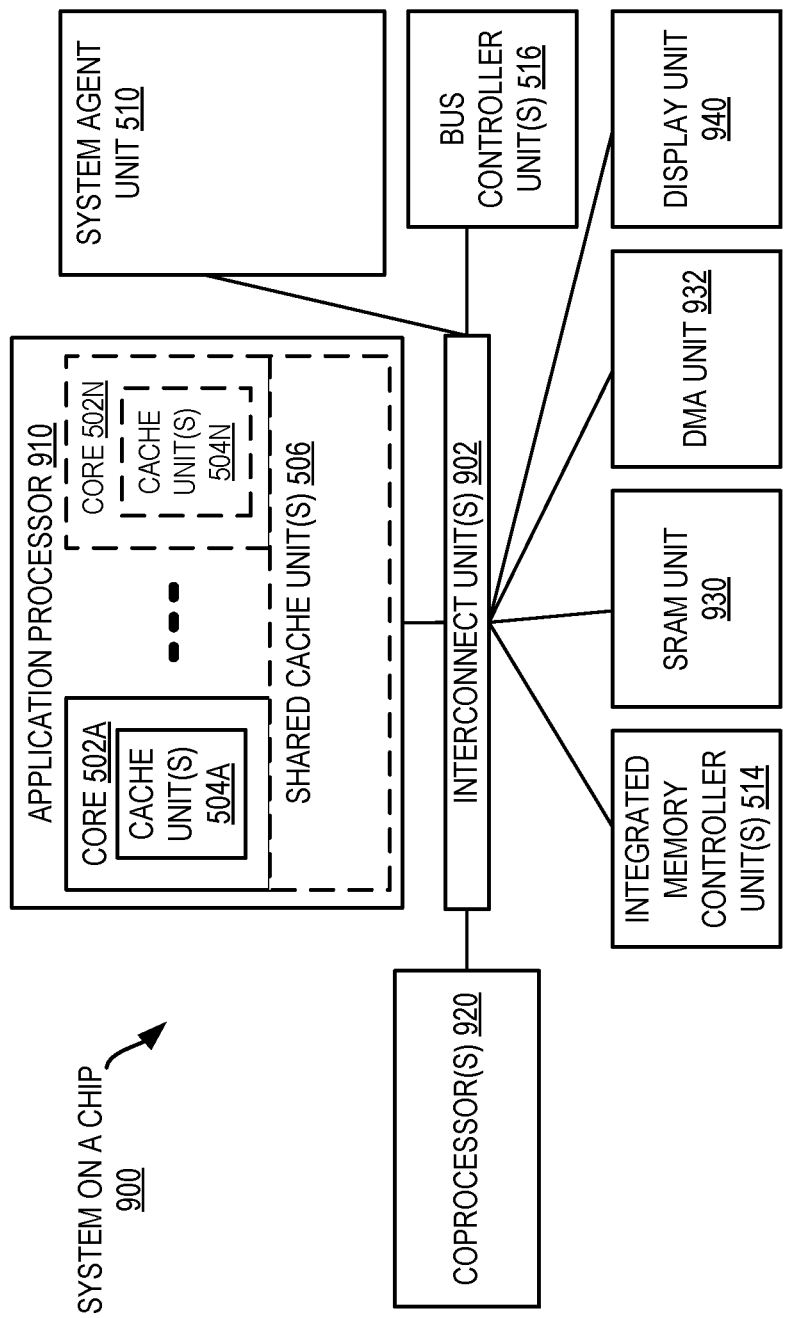
FIG. 9 is a block diagram of a system-on-a-chip according to embodiments.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N, which include cache units 504A-N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; an static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In this specification, operations in flow diagrams may have been described with reference to example embodiments of other figures. However, it should be understood that the operations of the flow diagrams may be performed by embodiments of the invention other than those discussed with reference to other figures, and the embodiments of the invention discussed with reference to other figures may perform operations different than those discussed with reference to flow diagrams. Furthermore, while the flow diagrams in the figures show a particular order of operations performed by certain embodiments of the invention, it should be understood that such order is provided as an example (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus comprising:
    a plurality of redundant execution units;
    a dispatcher to dispatch micro-operations to one or more of the plurality of redundant execution units, the micro-operations having a plurality of micro-operation types;
    a first counter to generate a first count of dispatches, during a window, of micro-operations having a first type of the plurality of micro-operation types; and
    a second counter to generate a second count of dispatches, during the window, of micro-operations having any type of the plurality of micro-operation types; and
    control hardware to cause a switch between a first mode and a second mode based in part on the first count and the second count; wherein in the first mode, the dispatcher is to dispatch micro-operations having the first type to only a subset of the plurality of redundant execution units;
    in the second mode, the dispatcher is to dispatch micro-operations having the first type to all of the plurality of redundant execution units;
    wherein the plurality of redundant execution units operate at a first clock frequency in the first mode and a second clock frequency in the second mode, wherein the second clock frequency is less than the first clock frequency; and wherein the control hardware is also to cause a switch from the first mode to the second mode in response to an indication that a dispatch rate of micro-operations having the first type in the first mode is greater than a first threshold, the indication based in part on a comparison of the first count of dispatches to the second count of dispatches.

2. The apparatus of claim 1, wherein the control hardware is also to store a second indicator in response to determining to cause the switch from the first mode to the second mode, wherein the second indicator is based on the second count to indicate an overall dispatch rate in the first mode.

3. The apparatus of claim 2, wherein the control hardware is also to determine, based in part on a first comparison of a third indicator to the second indicator, to cause a switch from the second mode to the first mode, wherein the third indicator is based on the second count to indicate an overall dispatch rate in the second mode.

4. The apparatus of claim 3, wherein the control hardware determining to cause the switch from the second mode to the first mode is also based on a second comparison of a fourth indicator to a second threshold, wherein the fourth indicator is based on the first count to indicate a dispatch rate of micro-operations having the first type in the second mode.

5. The apparatus of claim 4, wherein the control hardware determining to cause the switch from the second mode to the first mode is also based on a a difference in the first clock frequency and the second clock frequency.

6. The apparatus of claim 5, wherein the first comparison is based in part on the difference in the first clock frequency and the second clock frequency.

7. The apparatus of claim 6, further comprising a confidence counter to generate a fifth indicator, wherein the fifth indicator is based on the first comparison and the second comparison to check for stability of a performance increase.

8. The apparatus of claim 1, wherein execution of a micro-operation having the first type consumes more power than an average power based on all the plurality micro-operation types.

9. The apparatus of claim 1, wherein the first type is a fused multiply-add.

10. A method comprising:
dispatching, in a first mode, micro-operations having a first type of a plurality of micro-operation types, wherein in the first mode, micro-operations having the first type are dispatched to only a subset of a plurality of redundant execution units;
generating a first count of dispatches, during a window, of micro-operations having the first type;
generating a second count of dispatches, during the window, of micro-operations having any type of the plurality of micro-operation types;
determining, by control hardware to cause a switch from the first mode to a second mode based in part on the first count and the second count, wherein in the second mode, micro-operations having the first type are dispatched to all of the plurality of redundant execution units;
wherein the plurality of redundant execution units operates at a first clock frequency in the first mode and a second clock frequency in the second mode, wherein the second clock frequency is less than the first clock frequency;

wherein the control hardware switches from the first mode to the second mode in response to an indication that a dispatch rate of micro-operations having the first type in the first mode is greater than a first threshold, the indication based in part on a comparison of the first count of dispatches to the second count of dispatches; and dispatching, in the second mode, micro-operations having the first type to all of the plurality of redundant execution units.

11. The method of claim 10, further comprising storing second indicator in response to determining to cause the switch from the first mode to the second mode, wherein the second indicator is based on the second count to indicate an overall dispatch rate in the first mode.

12. The method of claim 11, further comprising determining, based in part on a first comparison of a third indicator to the second indicator, to cause a switch from the second mode to the first mode, wherein the third indicator is based on the second count to indicate an overall dispatch rate in the second mode.

13. The method of claim 12, wherein determining to cause the switch from the second mode to the first mode is also based on a second comparison of a fourth indicator to a second threshold, wherein the fourth indicator is based on the first count to indicate a dispatch rate of micro-operations having the first type in the second mode.

14. A system comprising:
a memory to store a first sequence of instructions and a second sequence of instructions; and
a processor core having:
a decoder to decode instructions into micro-operations having a plurality of micro-operation types;
a plurality of redundant execution units;
a dispatcher to dispatch micro-operations to one or more of the plurality of redundant execution units;
a first counter to generate a first count of dispatches, during a window, of micro-operations having a first type of the plurality of micro-operation types;
a second counter to generate a second count of dispatches, during the window, of micro-operations having any type of the plurality of micro-operation types; and
control hardware to cause a switch between a first mode and a second mode based in part on the first count and the second count; wherein
in the first mode, the dispatcher is to dispatch micro-operations having the first type to only a subset of the plurality of redundant execution units; and
in the second mode, the dispatcher is to dispatch micro-operations having the first type to all of the plurality of redundant execution units;
wherein the plurality of redundant execution units operates at a first clock frequency in the first mode and a second clock frequency in the second mode, wherein the second clock frequency is less than the first clock frequency; and
wherein the control hardware is also to cause a switch from the first mode to the second mode in response to an indication that a dispatch rate of micro-operations having the first type in the first mode is greater than a first threshold, the indication based in part on a comparison of the first count of dispatches to the second count of dispatches.

* * * * *